United States Patent
Chikamichi

(10) Patent No.: US 7,437,487 B2
(45) Date of Patent: Oct. 14, 2008

(54) STORAGE MEDIUM ARRAY CONTROLLER, A STORAGE MEDIUM ARRAY APPARATUS, A STORAGE MEDIUM DRIVE, A METHOD OF CONTROLLING A STORAGE MEDIUM ARRAY, AND A SIGNAL-BEARING MEDIUM EMBODYING A PROGRAM OF A STORAGE MEDIUM ARRAY CONTROLLER

(75) Inventor: Shoichi Chikamichi, Tokyo (JP)

(73) Assignee: NEC Corporation, Tokyo (JP)

( * ) Notice: Subject to any disclaimer, the term of this patent is extended or adjusted under 35 U.S.C. 154(b) by 223 days.

(21) Appl. No.: 11/346,221

(22) Filed: Feb. 3, 2006

(65) Prior Publication Data

US 2006/0179216 A1    Aug. 10, 2006

(30) Foreign Application Priority Data

Feb. 8, 2005    (JP)    ............................. 2005-032011

(51) Int. Cl.
*G06F 13/00*    (2006.01)
(52) U.S. Cl. .................... 710/8; 710/9; 710/10; 710/23; 710/25; 710/53; 711/112; 711/113; 711/114; 711/115

(58) Field of Classification Search ................ 710/8–10, 710/23, 25, 53; 711/112–115
See application file for complete search history.

(56) References Cited

U.S. PATENT DOCUMENTS

| 6,806,882 B2 | 10/2004 | Kanda |
| 6,981,095 B1 * | 12/2005 | MacLaren et al. ............ 711/115 |
| 7,212,307 B2 * | 5/2007 | Kanda ........................ 358/1.16 |

FOREIGN PATENT DOCUMENTS

JP    2001-100942    4/2001

OTHER PUBLICATIONS

Chinese Office Action dated Feb. 2, 2007, with English translation.

* cited by examiner

*Primary Examiner*—Tammara R Peyton
(74) *Attorney, Agent, or Firm*—McGinn IP Law Group, PLLC

(57) ABSTRACT

A storage medium drive is controllable by a storage medium array controller. the storage medium array controller receives a data storage medium drive information and the storage medium array controller sets a data transmission parameter with respect to the storage medium drive based on the data storage medium drive information.

33 Claims, 13 Drawing Sheets

COMPANY B HDD→BACKBOARD→COMMUNICATION LSI

COMPANY A HDD→BACKBOARD→COMMUNICATION LSI

SLOT14 (BACKBOARD LINE LENGTH 30cm)

SLOT 0 (BACKBOARD LINE LENGTH 15cm)

6.25Gbps 4.25Gbps

WITH PREEMPHASIS

WITHOUT PREEMPHASIS

STORAGE MEDIUM ARRAY CONTROLLER, A STORAGE MEDIUM ARRAY APPARATUS, A STORAGE MEDIUM DRIVE, A METHOD OF CONTROLLING A STORAGE MEDIUM ARRAY, AND A SIGNAL-BEARING MEDIUM EMBODYING A PROGRAM OF A STORAGE MEDIUM ARRAY CONTROLLER

BACKGROUND OF THE INVENTION

1. Technical Field

The present invention may relate to, for example, a storage medium array controller (e.g., a disk array controller, a tape medium apparatus or the like) that controls data storage media drives (e.g., a plurality of data storage media drives (e.g., hard disk drives, hereinafter referred to as "HDD", optical disk drives, tape media drives, etc.)). The present invention also may relate to, for example, a storage medium array apparatus, a storage medium drive, a method of controlling a storage medium array and, a signal-bearing medium embodying a program of a storage medium array controller.

2. Background Art

A data storage medium apparatus, for example, a disk array in which an array of a plurality of HDDs is provided and collectively made controllable as one HDD, is known (e.g., Japanese Patent Laid-Open No. 2001-100942). This disk array apparatus, for example, may be used as an external storage for a computer with an aim of improving the read/write speed and the reliability of data.

FIG. 9 shows an exemplary block diagram showing an exemplary conventional disk array 105 with respect to exemplary connections among exemplary HDD 101, exemplary backboard 102 and an exemplary HDD control package (hereinafter referred to as "HDD" control PKG) 103.

HDD 101 may include an HDD identification information storage section 112 in which information on the manufacturer, the disk capacity, the disk rotational speed and a firmware version, for example is stored, HDD mount position information storage section 111 indicating in which slot on backboard 102 HDD 101 is mounted, and an HDD transmission function setting section 113 for setting the output amplitude, the degree of preemphasis, the input impedance, the equalizer rate and the like, for example, to control an HDD-input/output (I/O) section 114 and may optimize the transmission quality.

SUMMARY OF THE INVENTION

Information items in HDD identification information storage section 111 and HDD mount position transmission function storage section 112 are used for constructing RAID (redundant array of inexpensive disks). The parameters set in HDD transmission function setting section 113 may be set to fixed values by the manufacturer and, therefore, are not used for optimizing transmission quality with respect to transmission mediums and communicating (large scale integrated circuits (LSIs)).

HDD control PKG 103 may include RAID construction parameter table storage section 134, communication LSI-I/O section 133 and communication LSI transmission function setting section 132, for example. Also in HDD control PKG 103, parameters set in communication LSI transmission function setting section 132 may be set to fixed values in advance. Therefore, the transmission quality cannot be optimized with respect to all HDDs used and all slot positions.

The reliability of disk array apparatus 105 provided, through backboard 102, with a plurality of HDD 101s is having a high-speed serial interface such as Fibre Channel, depends largely on the backboard transmission quality, for example. If the maximum transmission rate of the serial interface is about 2 Gbps, for example, then a margin of a transmitted waveform may be maintained comparatively easily. Therefore, transmission function settings of the degree of preemphasis and so forth may be made at suitable common values regardless of the backboard mount slot positions for the HDDs, manufacturers, versions, and so forth.

However, if the transmission rate is about 3 GHz or higher, for example, then effects including the skin effect of a wiring pattern, high-frequency loss due to dielectric loss, and multiple reflection due to impedance mismatching at a connector, for example, may become considerably increased and the degree of distortion in a transmitted waveform may vary exemplarily depending on the HDD mount position, i.e., the transmission length. In ordinary cases, if the backboard transmission length is longer, then the transmitted wave distortion may be increased and the transmission quality degrades.

Electrical serial I/O characteristics, for example, the drive ability, the waveform rise time, the output amplitude, the input impedance and the input sensitivity, and serial I/O waveform shaping abilities, for example, the degree of preemphasis and the equalizer rate, may vary among HDD vendors. These characteristics may also vary among HDD versions of one vendor. Thus, the degree of distortion may vary, for example, largely depending on HDD attributes.

Exemplary problems associated with increased transmission rate will be concretely described with reference to drawings. FIGS. 10A and 10B show an exemplary comparison between waveforms with respect to exemplary different HDD models, using actual disk array apparatus 105. Referring to FIGS. 10A and 10B, the same slot 0 (backboard line length: 15 cm) is used as HDD backboard mount positions, for example, and transmission is performed at 2.125 Gbps, for example. As shown, there is a difference in waveform between the HDD models.

FIGS. 11A and 11B show an exemplary comparison between waveforms with respect to exemplary HDD mount positions, using actual disk array apparatus 105. Referring to FIGS. 11A and 11B, for example, an HDD and a communication LSI are used in common and transmission is performed at 2.125 Gbps, for example. As shown, that there is a difference in waveform between slots (i.e., backboard line lengths).

FIGS. 12A and 12B show an exemplary comparison between waveforms with respect to the exemplary transmission rate, using an exemplary backboard for transmission evaluation. Referring to FIGS. 12A and 12B, different communication LSIs are used at 4.25 Gbps and 6.25 Gbps, but both the backboard line lengths are 30 cm. As shown, if the transmission rate is increased, then the eye opening is reduced due to the influence of high-frequency loss and dielectric loss for example.

FIGS. 13A and 13B show an exemplary comparison between waveforms with respect to exemplary preemphasis performed as one function of the communication LSI to increase the eye opening, using the exemplary backboard for transmission evaluation. Referring to FIGS. 13A and 13B, the transmission rate is 6.25 Gbps and both the backboard line lengths are 30 cm. As shown, the eye opening is increased by performing the preemphasis function.

The difficulty in making transmission function settings of the degree of preemphasis and so forth at suitable common values with respect to backboard mount slot positions for HDDs, manufacturers, versions, and so forth may increase with the increased transmission rate, for example.

In view of the foregoing and other exemplary problems, drawbacks, and disadvantages of the conventional techniques, it is an exemplary feature of the present invention to provide a storage medium array controller or the like capable of setting optimum transmission functions with respect to storage media drives (e.g., each HDD).

The present invention provides a storage medium array controller. A storage medium drive is controllable by the storage medium array controller. The storage medium array controller receives a data storage medium drive information, and the storage medium array controller sets a data transmission parameter with respect to the storage medium drive based on the data storage medium drive information.

The present invention also provides a storage medium array controller. A plurality of storage medium drives is controllable by the storage medium array controller. The storage medium array controller sets a first data transmission parameter with respect to one of the storage medium drives, and the storage medium array controller sets a second data transmission parameter with respect to another one of the storage medium drives. The first data transmission parameter is different from the second data transmission parameter.

The present invention also provides a storage medium array apparatus including the storage medium array controller above, and a storage medium drive.

The present invention also provides a storage medium drive including a storage medium-side transmission function setting device that sets a data transmission parameter. The data transmission parameter is output from the storage medium array controller.

The present invention also provides a method of controlling a storage medium array including receiving a data storage medium drive information to a storage medium array controller, and selectively setting a data transmission parameter with respect to the data storage medium drive based on the data storage medium drive information.

The present invention also provides a signal-bearing medium embodying a program of machine-readable instructions executable by a digital processing apparatus, the program causing a storage medium array controller to perform a method above.

Exemplary Advantages of the Invention

According to the present invention, the present invention provides a storage medium array controller. A storage medium drive is controllable by the storage medium array controller. The storage medium array controller receives a data storage medium drive information, and the storage medium array controller sets a data transmission parameter with respect to the storage medium drive based on the data storage medium drive information.

Therefore, for example, stabile transmission quality may be ensured no matter what the mounted position and electrical characteristics of storage medium drive (e.g., each HDD), thus achieving an improved reliability of storage medium array apparatus (e.g., the disk array apparatus).

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

DETAILED DESCRIPTION OF THE EXEMPLARY EMBODIMENTS

Figure 1:
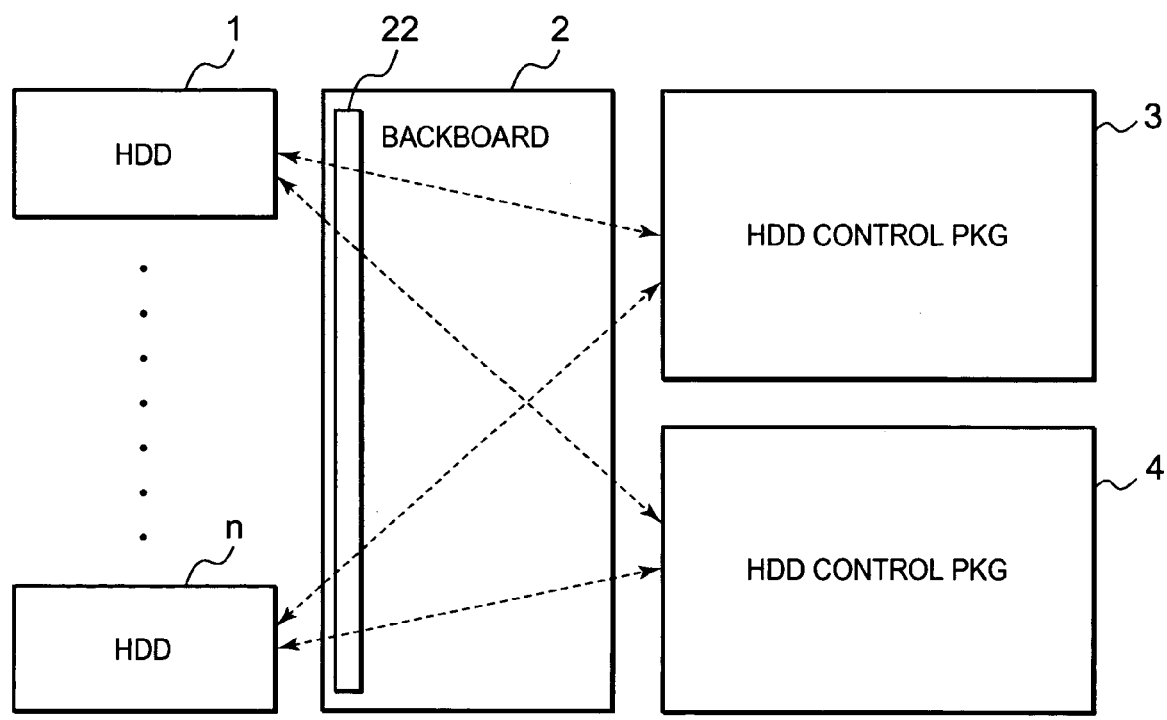
FIG. 1 shows an exemplary block diagram showing a first exemplary embodiment of disk array apparatus 5 in accordance with the present invention.

For example, in terms of the storage medium array controller, a plurality of the storage medium drives may be controllable by the storage medium array controller, the storage medium array controller may selectively receive data storage medium drive information with respect to each of the storage medium drives, and the storage medium array controller may selectively set the data transmission parameter based on each of the data storage medium drive information.

Thus, storage medium (e.g., HDD) information about each storage medium (e.g., HDD) is input and the data transmission parameter may be determined with respect to each storage medium (e.g., HDD) on the basis of the storage medium (e.g., HDD) information, for example. Therefore, an optimum transmission function may be set with respect to each storage medium (e.g., HDD). The advantage may be particularly noticeable in a case where data transmission is performed by high-speed serial communication. That is because if the transmission rate is higher, transmission quality varies easier, depending on the type and position of the storage media (e.g., HDDs).

The storage medium array controller may include an information input device that inputs the storage medium drive information from the storage medium drive.

The storage medium array controller may further include a parameter determination device that determines the data transmission parameter based on the storage medium drive information.

The storage medium drive may include a storage medium-side transmission function setting device that sets the data transmission parameter, and the storage medium array controller may include a parameter output device that outputs the data transmission parameter determined by the parameter determination device to the storage medium-side transmission function setting device.

The storage medium array controller may include a control-side transmission function setting device that sets the data transmission parameter, and the storage medium array controller may include -a parameter output device that outputs the data transmission parameter determined by the parameter determination device to the control-side transmission function setting device.

The parameter determination device may include a transmission parameter table indicating correspondence between the storage medium drive information and the data transmission parameter; and the parameter determination device may determine the data transmission parameter by collating the storage medium drive information input from the information input device with the transmission parameter table.

The storage medium drive information may include at least one of identification information and mount position information about the storage medium drive.

The data transmission parameter may include at least one of an output amplitude, a degree of preemphasis, an input impedance and an equalizer rate.

At the time of at least one of powering-up of the storage medium array controller, replacement of the storage medium drive, and addition of the storage medium drive, the information input device may receive the storage medium drive information, the parameter determination device may determine the data transmission parameter, and the parameter output device may output the data transmission parameter.

The data transmission may be performed by high-speed serial communication.

The storage medium drive may include a hard disk drive.

In terms of the storage medium array apparatus, the storage medium drive may include a storage medium-side transmission parameter table storage device in which a transmission parameter table indicating correspondence between the storage medium drive information and the data transmission parameter is storable. The storage medium array controller may include a parameter determination device that determines the data transmission parameter based on the storage medium drive information. The parameter determination device may be selectively supplied with the transmission parameter table from the storage medium-side transmission parameter table storage device.

For example, this disk-side transmission function setting section may differ from the conventional art in having a function to set a data transmission parameter output from the disk array controller.

The parameter determination device may determine the data transmission parameter by collating the storage medium drive information with the transmission parameter table.

The storage medium array apparatus may include a connection device through which the storage medium drive and the storage medium array controller are connectable to each other. The connection device may include an attachment/detachment mechanism that is attachable/detachable to the storage medium drive, and a storage medium drive mount position information output device that outputs storage medium drive mount position information to the storage medium drive attached to the attachment/detachment mechanism. The storage medium drive may include a storage medium-side transmission function setting device that sets the data transmission parameter relating to data transmission, a storage medium-side data input/output device that executes data transmission to the storage medium array controller, a storage medium drive mount position information storage device that stores the storage medium drive mount position information output from the storage medium drive mount position information output device, and a storage medium drive identification information storage device that includes storage medium drive identification information stored in advance. The storage medium array controller may further include a control-side transmission function setting device that sets the data transmission parameter relating to data transmission, a control-side data input/output device that executes data transmission to the storage medium drive, a control-side transmission parameter table storage device that includes a information input device that inputs storage medium drive information from the storage medium drive, a parameter determination device that determines the data transmission parameter based on the storage medium drive information, and a parameter output device that outputs the data transmission parameter determined by the parameter determination device to the storage medium-side transmission function setting device, and a redundant array of inexpensive disks (RAID) construction parameter table storage device that sets a RAID construction parameter by inputting the storage medium drive mount position information from the storage medium drive mount position information storage device and the storage medium drive identification information from the storage medium drive identification information storage device.

The storage medium drive may include: a storage medium-side transmission parameter table storage device in which a transmission parameter table indicating correspondence between storage medium drive information about the storage medium drive and the data transmission parameter is storable.

The transmission parameter table may be written at the time of formatting of the storage medium drive.

The method of controlling a storage medium array may further include providing a data storage medium drive.

The method of controlling a storage medium array may further include determining the data transmission parameter based on the input storage medium drive information.

The method of controlling a storage medium array may further include powering up the storage medium array controller and the data storage medium drive.

The method of controlling a storage medium array may further include referring to at least one of storage medium drive mount position information and storage medium drive identification information, at a time of detecting a slot position signal.

The method of controlling a storage medium array may further include connecting the storage medium drive to a connection device, at a time of not detecting a slot position signal.

The method of controlling a storage medium array may further include collating at least one of the storage medium drive mount position information and the storage medium drive identification information with a transmission parameter table.

The method of controlling a storage medium array may further include overwriting the transmission parameter table in the storage medium array controller with the transmission parameter table stored in the storage medium drive, when the storage media drive identification information is not stored in the transmission parameter table.

The method of controlling a storage medium array may further include transmitting a transmission parameter to a storage medium drive transmission function setting section to set the transmission parameter.

The method of controlling a storage medium array may further include providing a transmission function setting section in the storage medium drive.

The method of controlling a storage medium array may further include providing a communication LSI transmission function setting section in the storage medium array controller.

The method of controlling a storage medium array may further include initiating data transfer between a storage medium drive and the communication LSI transmission function setting section.

For example, the present invention may be characterized in that, in disk array apparatus capable of mounting a plurality of HDDs having a high-speed serial interface such as Fibre Channel, HDD mount position information and HDD identification information are automatically detected at the time of powering up and at the time of HDD replacement. These sorts of information are collated with a parameter which is stored in advance and by which transmission quality is optimized. The result of this collation is automatically transmitted to the HDD and a communication LSI in the HDD control PKG to perform the corresponding function, and data transmission is thereafter initiated.

Exemplary Embodiment

FIG. 1 shows an exemplary block diagram showing a first exemplary embodiment of disk array apparatus 5 in accordance with the present invention.

Disk array apparatus 5 in this first exemplary embodiment may include, for example, data storage media drives 1 (e.g., "HDDs 1", tape media, or optical disks, and so on. Hereinbelow, "HDDs 1 to n" will be described as one example of data storage media drives 1. As evident to one of ordinary skill in the art, taking the present application as a whole, the invention can be applied in other data storage media (such as tape media, or optical disks, and so on.) to n, connection device 2 (e.g.,. backboard 2; hereinbelow, backboard 2 will be described as an example of connection device 2), and HDD control PKGs 3 and 4. Backboard 2 may include an attachment/detachment mechanism 22 HDDs 1 to n may be mechanically and electrically connected to HDD control PKGs 3 and 4 through backboard 2.

There may be any number of manufacturers of HDDs 1 to n and any number of mounted HDDs, depending on product characteristics of disk array apparatus 5. Also, the positions in which HDDs 1 to n are mounted may be arbitrarily selected. A plurality (e.g., two) HDD control PKGs 3 and 4 may be provided to improve redundancy in disk array apparatus 5. Accordingly, HDD control PKGs 3 and 4 respectively may have identical functions.

Figure 2:
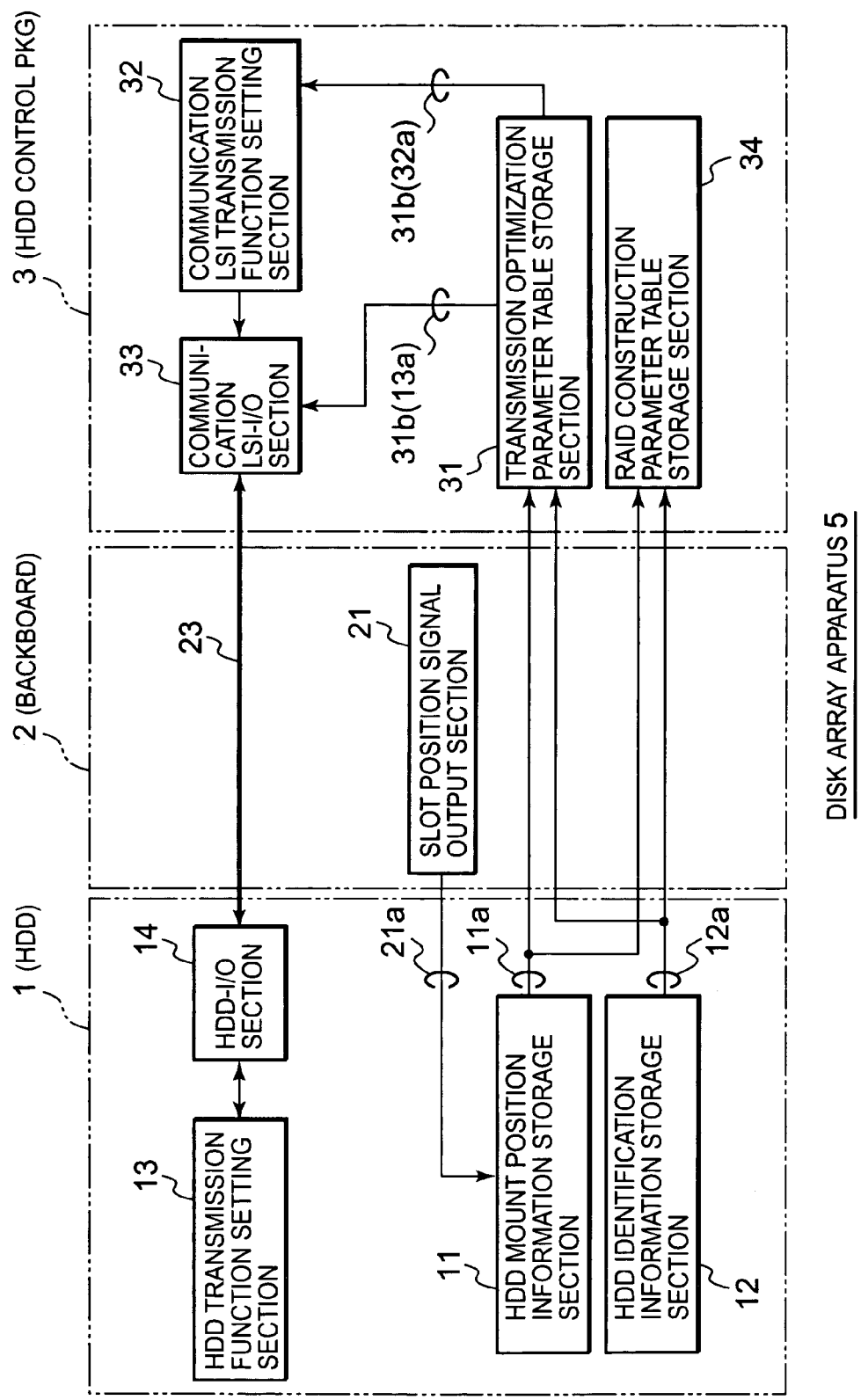
FIG. 2 shows an exemplary block diagram showing exemplary disk array apparatus 5 in the first exemplary embodiment with respect to connections among exemplary HDD 1, exemplary backboard 2 and exemplary HDD control PKG 3.

FIG. 2 shows an exemplary block diagram showing exemplary disk array apparatus 5 in the first exemplary embodiment with respect to connections among exemplary HDD 1, exemplary backboard 2 and exemplary HDD control PKG 3.

HDD 1 and HDD control PKG 3 may be connected to each other through backboard 2, for example. Backboard 2 may include an attachment/detachment mechanism 22 (shown in FIG. 1) for detachably attaching HDD 1 and a slot position signal output section 21 which outputs slot position signal 21a to HDD 1 attached to the attachment/detachment mechanism.

For example, HDD 1 may have HDD transmission function setting section 13 capable of setting data transmission parameters 31b relating to transmission of data, HDD-I/O section 14 which executes data transmission to HDD control PKG 3, HDD mount position information storage section 11 in which slot position signal 21a output from slot position signal output section 21, i.e., HDD mount position information 11a, is stored, and HDD identification information storage section 12 in which HDD identification information 12a is stored in advance. HDD transmission function setting section 13 may differ from the conventional HDD transmission function setting section by having the function of setting data transmission parameters 31b output from HDD control PKG 3.

HDD control PKG 3 may include, for example, communication LSI transmission function setting section 32 capable of setting data transmission parameters 31b relating to data transmission, communication LSI-I/O section 33 which executes data transmission to HDD 1, transmission optimization parameter table storage section 31, and to which HDD mount position information 11a and HDD identification information 12a from HDD mount position information storage section 11 and HDD identification information storage section 12 are input, and which sets RAID construction parameters.

Figure 3:
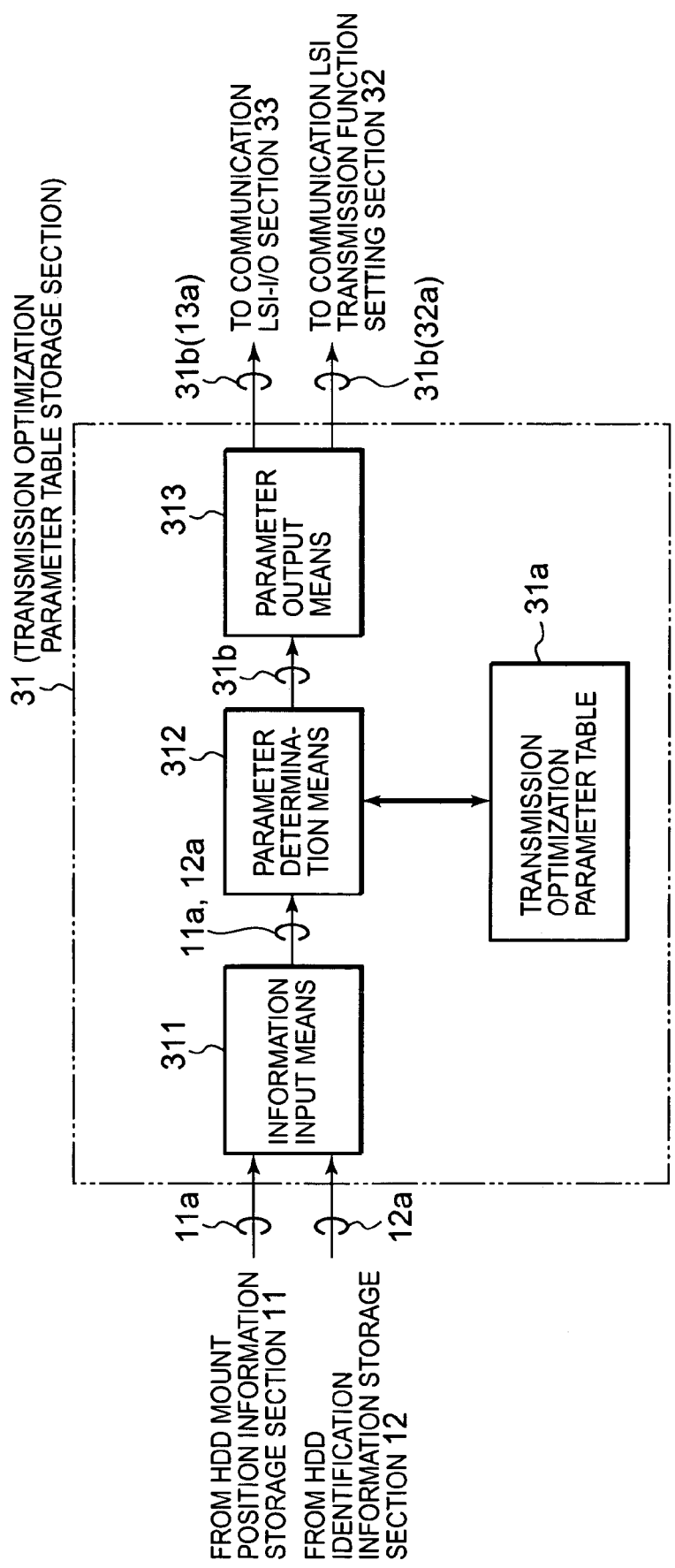
FIG. 3 shows an exemplary block diagram showing exemplary transmission optimization parameter table storage section 31 in exemplary disk array apparatus 5 in the first exemplary embodiment.

FIG. 3 shows an exemplary block diagram showing exemplary transmission optimization parameter table storage section 31 in exemplary disk array apparatus 5 in the first embodiment. Description will be made below with reference to FIGS. 2 and 3.

For example, transmission optimization parameter table storage section 31 may include, as an exemplary feature of the present invention, information input means 311, parameter determination means 312, parameter output means 313 and transmission optimization parameter table 31a. For example, transmission optimization parameter table 31a may show correspondence between HDD mount position information 11a and HDD identification information 12, and the data transmission parameter 31b. Information input means 311 may input HDD mount position information 11a and HDD identification information 12a from HDD mount position information storage section 11 and HDD identification information storage section 12.

Parameter determination means 312 may determine data transmission parameters 31b, for example, by collating HDD mount position information 11a and HDD identification information 12a input from information input means 311 with transmission optimization parameter table 31a. Parameter output means 313 may output data transmission parameters 31b determined by parameter determination means 312 to HDD transmission function setting section 13 via the communication LSI-I/O section 33 and HDD-I/O section 14, and also may output the parameters to communication LSI transmission function setting section 32.

Information input means 311, parameter determination means 312 and parameter output means 313 may be implemented by pieces of firmware, for example. However, they may alternatively be implemented by software (computer programs). For example, a CPU may function as each means by reading a program stored in a memory.

Further detailed description will be made with reference to FIG. 2. HDD I may include HDD mount position information storage section 11 indicating an HDD mount position information (e.g., in which slot on backboard 2 HDD 1 is mounted), HDD identification information storage section 12 in which information an HDD identification information (e.g., the manufacturer of HDD 1, a firmware version, and so forth) may be stored, and HDD transmission function setting section 13 for controlling HDD-I/O section 14 and setting the degree of preemphasis and so forth for optimization of transmission quality. Backboard 2 may have slot position signal output section 21 for identifying the position of each slot.

HDD control PKG 3 may include, for example, transmission optimization parameter storage table 31 in which parameters for optimizing transmission quality with respect to each HDD mount position and each HDD may be stored, communication LSI transmission function setting section 32 for controlling the communication LSI-I/O section 33 and setting the degree of preemphasis and so forth for optimization of transmission quality, and RAID construction parameter table storage section 34 for constructing RAID.

Electrical characteristics in the interface of HDD 1 ordinarily may vary among manufacturers and among firmware versions, but may be determined by referring to the manufacturer and firmware version in the information stored in HDD identification information storage section 12.

Figure 4:
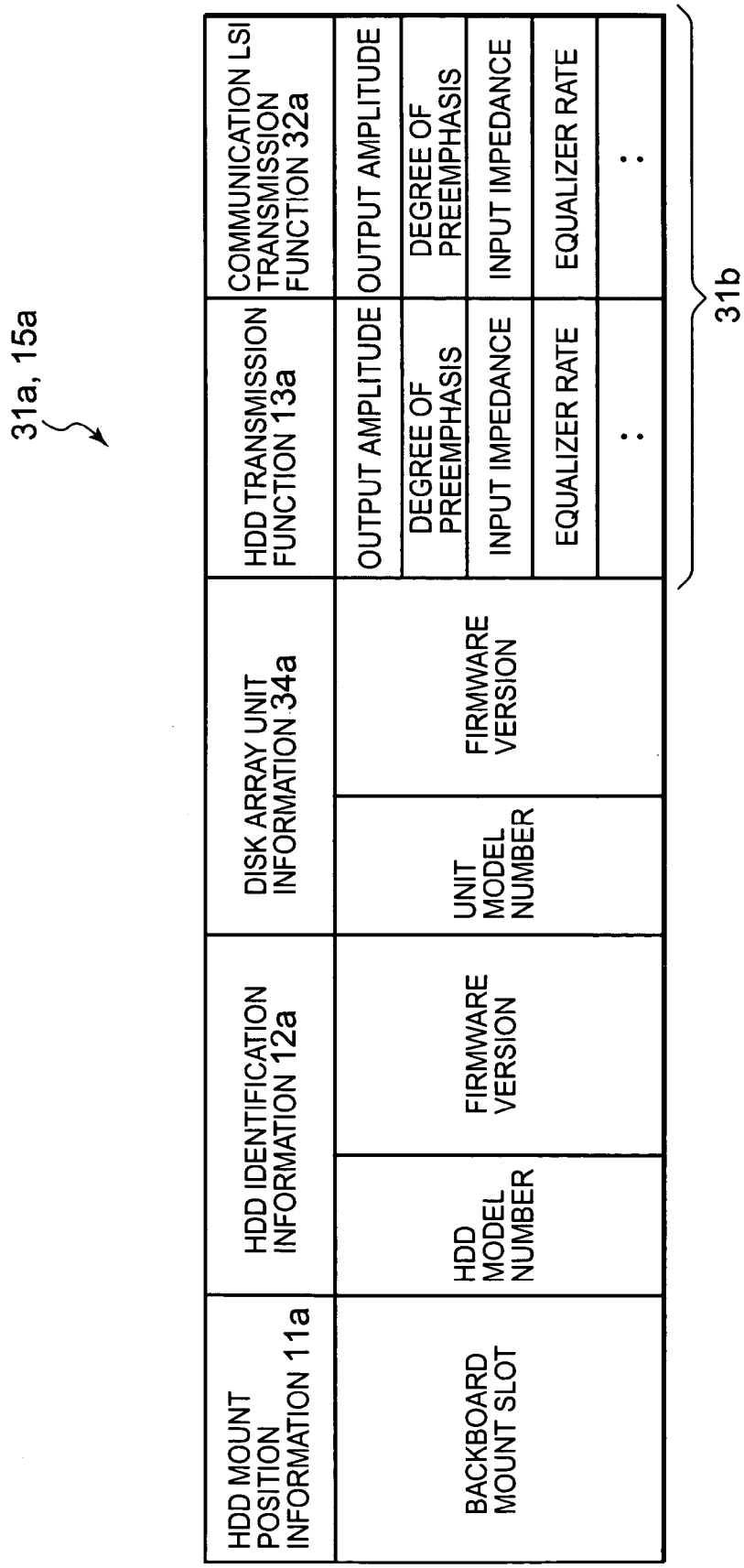
FIG. 4 shows an diagram showing exemplary transmission optimization parameter table 31a, 15a stored in exemplary transmission optimization parameter table storage section 31 in exemplary disk array apparatus 5 in the first exemplary embodiment.

FIG. 4 shows a diagram showing exemplary transmission optimization parameter table 31a, 15a stored in exemplary transmission optimization parameter table storage section 31 in exemplary disk array apparatus 5 in the first exemplary embodiment. Description will be made below with reference to FIGS. 2-4.

HDD mount position information 11a may be information stored in HDD mount position information storage section 11. HDD identification information 12a may be information stored in HDD identification information storage section 12. HDD transmission functions 13a may be data transmission parameters 31b set in HDD transmission function setting section 13. Communication LSI transmission functions 32a may be the data transmission parameter 31b set in communication LSI transmission function setting section 32.

In transmission optimization parameter table 31a, for example, data transmission parameters 31b (e.g., the degree of preemphasis, the output amplitude, the input impedance and the equalizer rate etc. in HDD transmission functions 13a and the communication LSI transmission functions 32a, through which the transmitted waveform may be shaped), may be stored with respect to information (e.g., with respect to each mount slot on backboard 2 as HDD mount position information 11a, with respect to each HDD model number (including the manufacturer) and each firmware version as HDD identification information 12a, and with respect to the unit model number and the corresponding firmware version as disk array apparatus 5 information 34a). These data transmission parameters 31b may need to be set in a comprehensive manner through an experiment or simulation.

Attachment/detachment mechanism 22 of backboard 2 and RAID construction parameter table storage section 34 may not directly relate to the present invention. Therefore, description thereof will be omitted.

Figure 5:
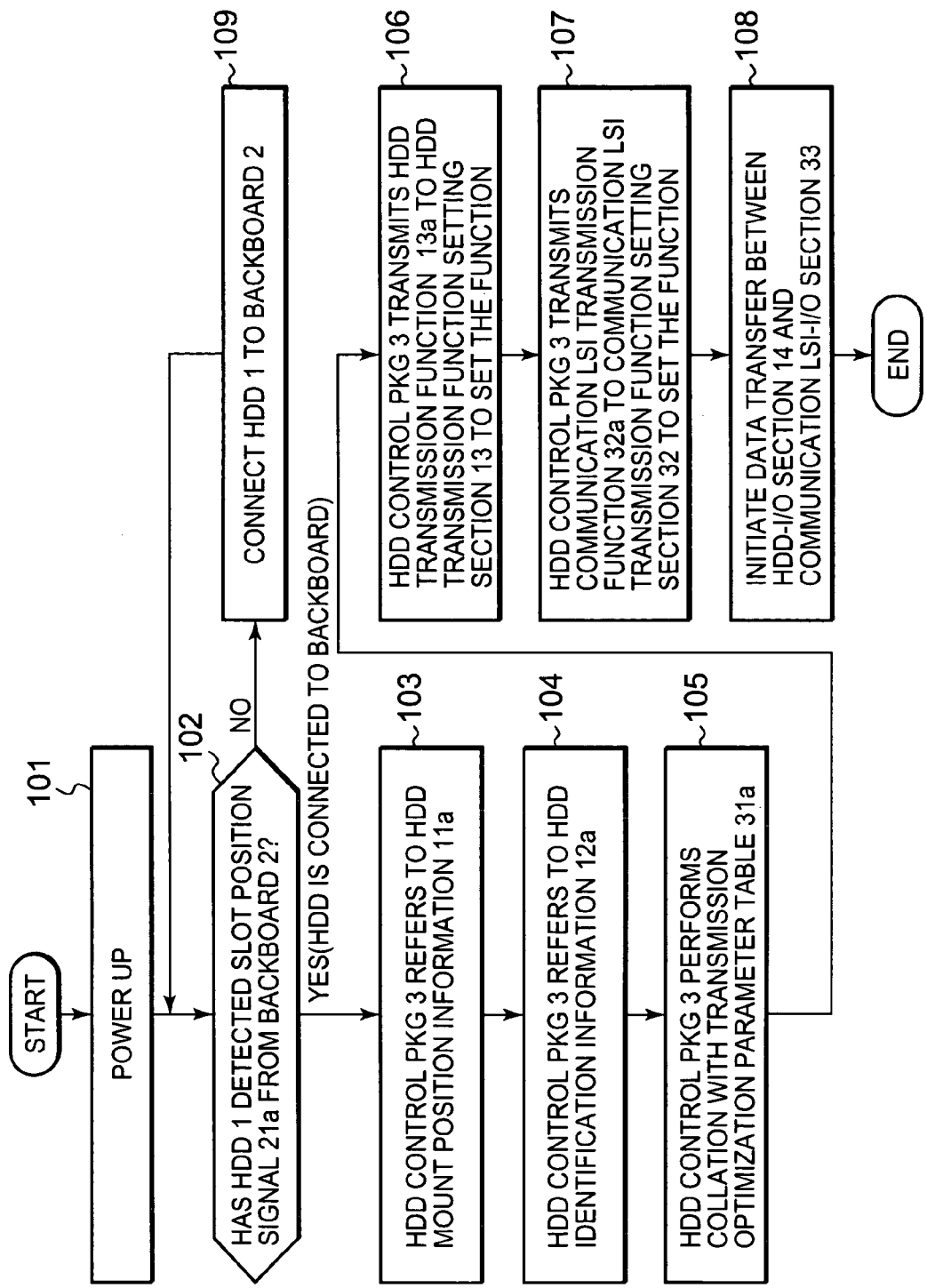
FIG. 5 shows an exemplary flowchart showing an exemplary operation in exemplary disk array apparatus 5 in the first exemplary embodiment.

FIG. 5 shows an exemplary flowchart showing an exemplary operation in exemplary disk array apparatus 5 in the first exemplary embodiment. Description will be made below with reference to FIGS. 2-5.

After powering up (step 101), if HDD 1 has already been connected to backboard 2 or if it is added (step 109), then HDD 1 detects slot position signal 21a from backboard 2 (step 102). On the other hand, HDD control PKG 3 automatically detects HDD mount position information 11a (step 103) to recognize in which slot HDD 1 has been mounted. HDD control PKG 3 also refers automatically to HDD identification information 12a (step 104) to recognize the manufacturer and the firmware version of HDD 1.

Further, HDD control PKG 3 collates HDD mount position information 11a and HDD identification information 12a with transmission optimization parameter table 31a (step 105) and automatically transmits the matching data transmission parameters 31b to HDD transmission function setting section 13 and to communication LSI transmission function setting section 32, thereby enabling the parameters to function (steps 106 and 107). Thereafter, the data transmission between HDD-I/O section 14 and the communication LSI-I/O section 33 is started (step 108).

For example, if a plurality of storage medium drives (e.g., HDDS) are connected to backboard 2, then, storage medium array controller (e.g., HDD control PKG 3) sets a first data transmission parameter (e.g., data transmission parameters 31b) with respect to one of the storage medium drives (e.g., HDDs), and the storage medium array controller (e.g., HDD control PKG 3) sets a second data transmission parameter (e.g., data transmission parameters 31b) with respect to another one of the storage drives (e.g., HDDs). The first data transmission parameter may be different from the second data transmission parameter.

In this exemplary flowchart, HDD mount position information 11a and HDD identification information 12a are input from HDD1 to HDD control PKG 3. HDD mount position information 11a and HDD identification information 12a may be input from another device (e.g., a memory (e.g., CD-ROM, a memory stick, etc.), keyboard (i.e., manually input), or a server on the network) to HDD control PKG 3, alternatively. Data transmission parameters 31b may be input from another device (e.g., a memory (e.g., CD-ROM, a memory stick, etc.), keyboard (i.e., manually input), or a server on the network) to HDD control PKG 3.

Thus, HDD mount position information 11a and HDD identification information 12a may be automatically detected at the time of powering up and at the time of HDD interchange, and may be collated with data transmission parameters 31b stored in advance as parameters through which transmission quality is optimized. The collation results may be automatically transmitted to HDD transmission function setting section 13 in HDD I and to the communication LSI-I/O section 33 in HDD control PKG 3 to enable the corresponding functioning. Data transmission is thereafter started, thus enabling transmission quality to be autonomically optimized, for example, and improving the reliability of disk array apparatus 5.

Hence, many exemplary effects may be obtained in this exemplary embodiment. For example, transmission parameters optimized with respect to the mounted position of an HDD and the electrical characteristics of HDD may be set and made to function, thereby ensuring stable transmission quality. The reliability of disk array apparatus 5 may be improved accordingly. Further, transmission parameters optimized with respect to HDD mount position and HDD electrical characteristics may be automatically set and made to function, thereby enabling optimum transmission quality to be autonomically continued even at the time of on-line HDD interchange. Additionally, transmission parameters optimized with respect to HDD mount position and HDD electrical characteristics may be automatically set and made to function, thereby allowing multiple manufacturers' HDDs to be used optimally.

Figure 6:
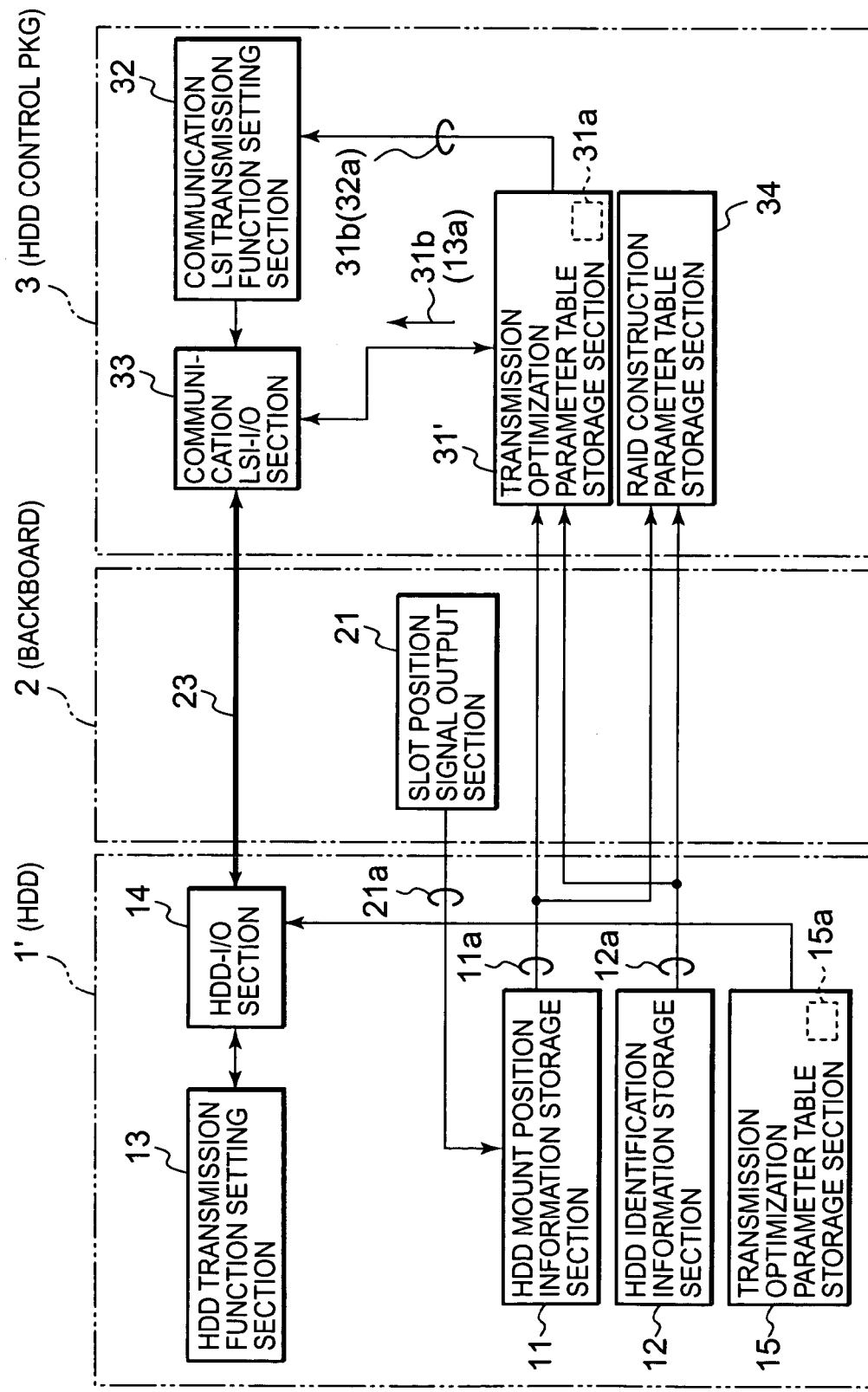
FIG. 6 shows an exemplary block diagram showing a second exemplary embodiment of exemplary disk array apparatus 5 in accordance with the present invention, with respect to exemplary connections among exemplary HDD 1', exemplary backboard 2 and exemplary HDD control PKG 3.

FIG. 6 shows an exemplary block diagram showing a second exemplary embodiment of exemplary disk array apparatus 5 in accordance with the present invention, with respect to exemplary connections among exemplary HDD 1', exemplary backboard 2 and exemplary HDD control PKG 3. Components identical to those shown in FIG. 2 are indicated by the same reference characters, and description of the identical components will be omitted.

HDD 1' in this second exemplary embodiment is characterized by having transmission optimization parameter table storage section 15 in which transmission optimization parameter table 15a (FIG. 4) showing correspondence between HDD mount position information 11a and HDD identification information 12a about HDD 1' and data transmission parameters 31b may be stored in advance, for example.

On the other hand, parameter determination means 312 (FIG. 3) may operate as described below with respect to transmission optimization parameter table storage section 31' of HDD control PKG 3, for example. Transmission optimization parameter table 15a may be input from transmission optimization parameter table storage section 15 as required, and HDD mount position information 11a and HDD identification information 12a, for example, separately input, may be collated with transmission optimization parameter table 15a to determine data transmission parameters 31b.

A case will be considered in which the data corresponding to HDD1' newly mounted is not contained in transmission optimization parameter table 31a in transmission optimization parameter table storage section 31', for example. In this exemplary case, transmission optimization parameter table 15a may be input from transmission optimization parameter table storage section 15 to transmission optimization parameter table storage section 31' via HDD-I/O section 14 and the communication LSI-I/O section 33, and transmission optimization parameter table 31a is overwritten with transmission optimization parameter table 15a.

Figure 7:
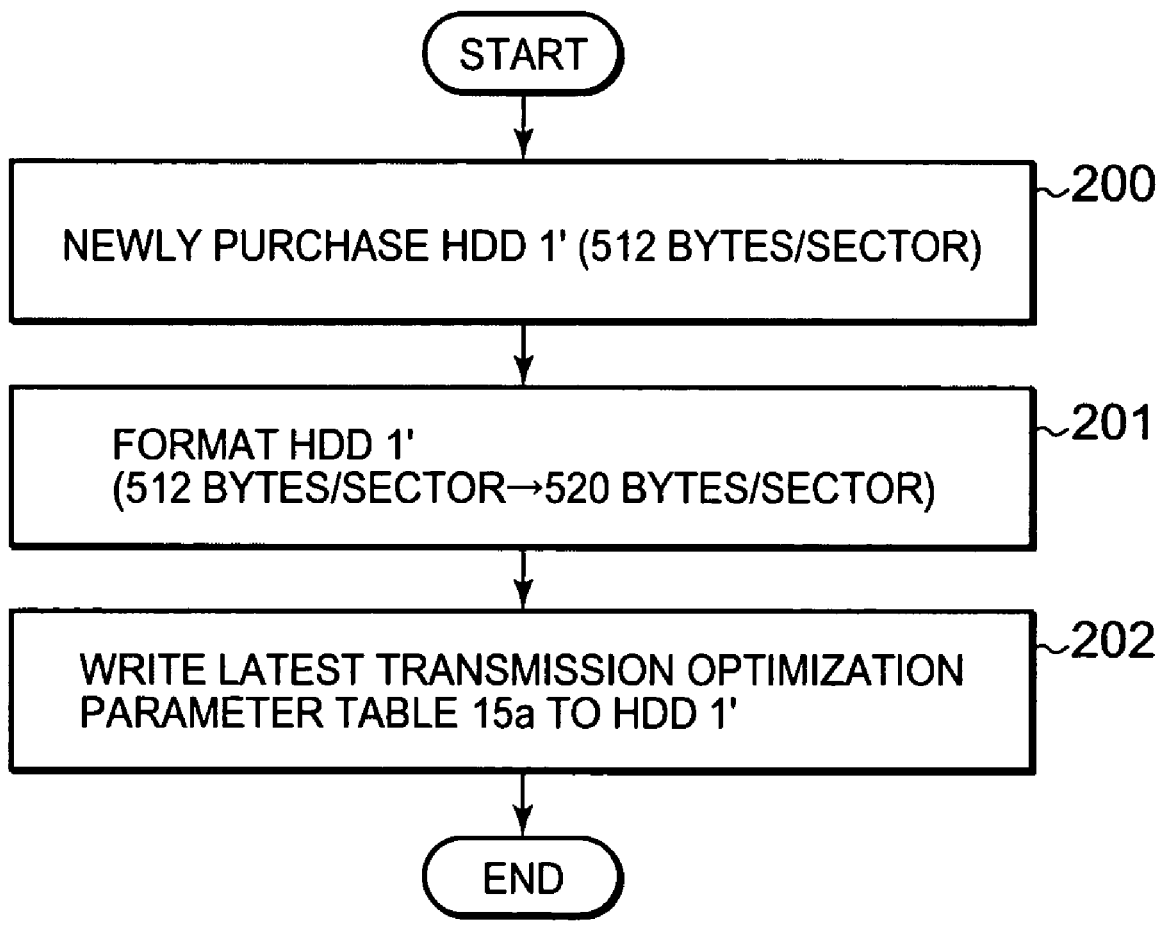
FIG. 7 shows an exemplary flowchart showing an exemplary operation to write an exemplary transmission optimization parameter table 15a in exemplary HDD 101 in exemplary disk array apparatus 5 in the second exemplary embodiment.

FIG. 7 shows an exemplary flowchart showing an exemplary operation to write an exemplary transmission optimization parameter table 15a in exemplary HDD 101 in exemplary disk array apparatus 5 in the second exemplary embodiment. Description will be made below with reference to FIGS. 6 and 7.

First, HDD 1' may be newly purchased (step 200). Formatting of HDD 1' may be subsequently performed (step 201). In this step 201, for example, 8 bytes of CRC (cyclic redundancy check) are added to 512 byte in each sector to make conversion to 520 bytes. At this time, the latest transmission optimization parameter table 15a may be written to HDD 1' (step 202). If transmission optimization parameter table 15a is also written at the time of formatting of HDD 1' as described above, then it may be unnecessary to separately provide an opportunity to write the table and, therefore, the manufacturing process may be simplified.

Figure 8:
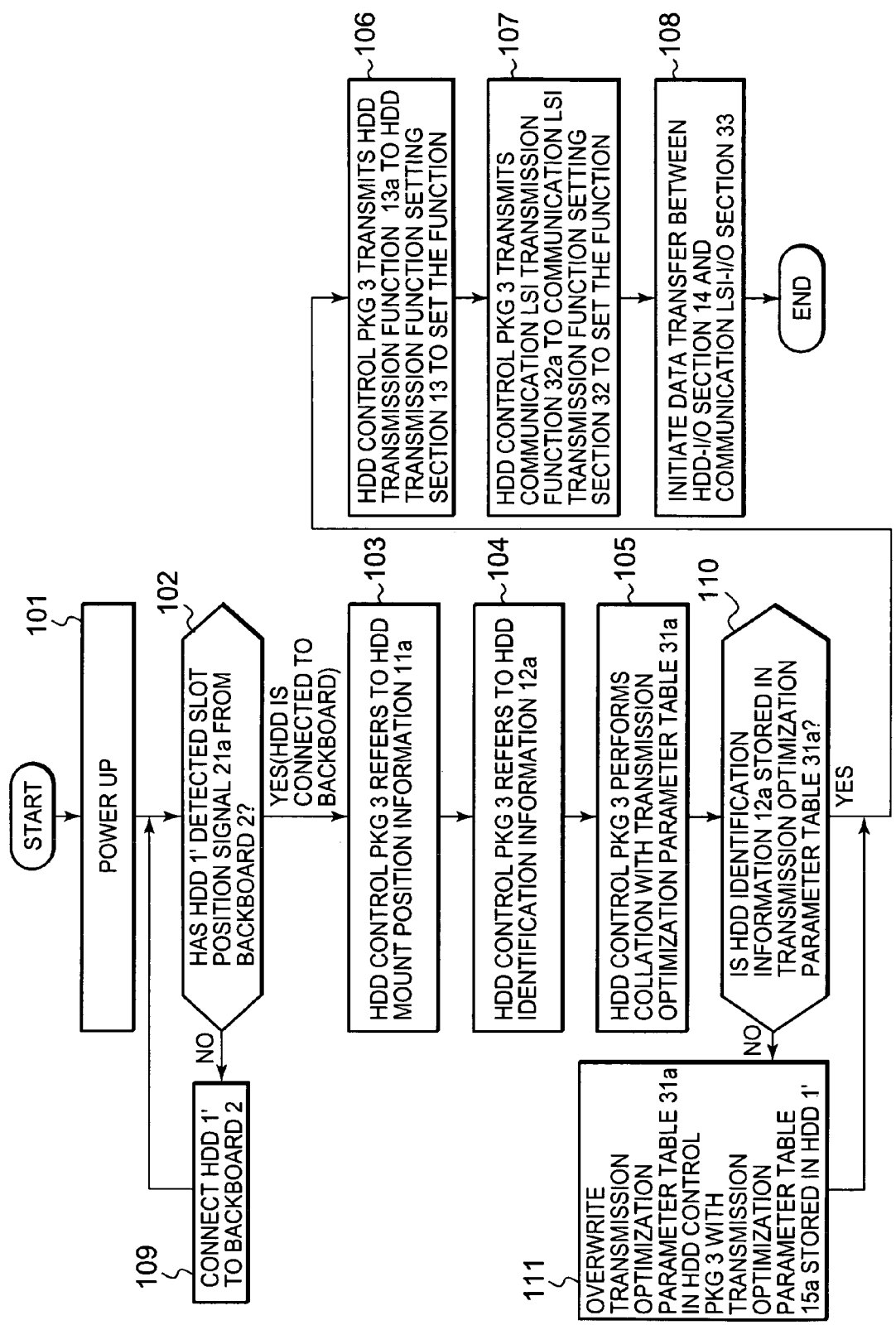
FIG. 8 shows an exemplary flowchart showing an exemplary operation in exemplary disk array apparatus 5 in the second exemplary embodiment.
Figure 9:
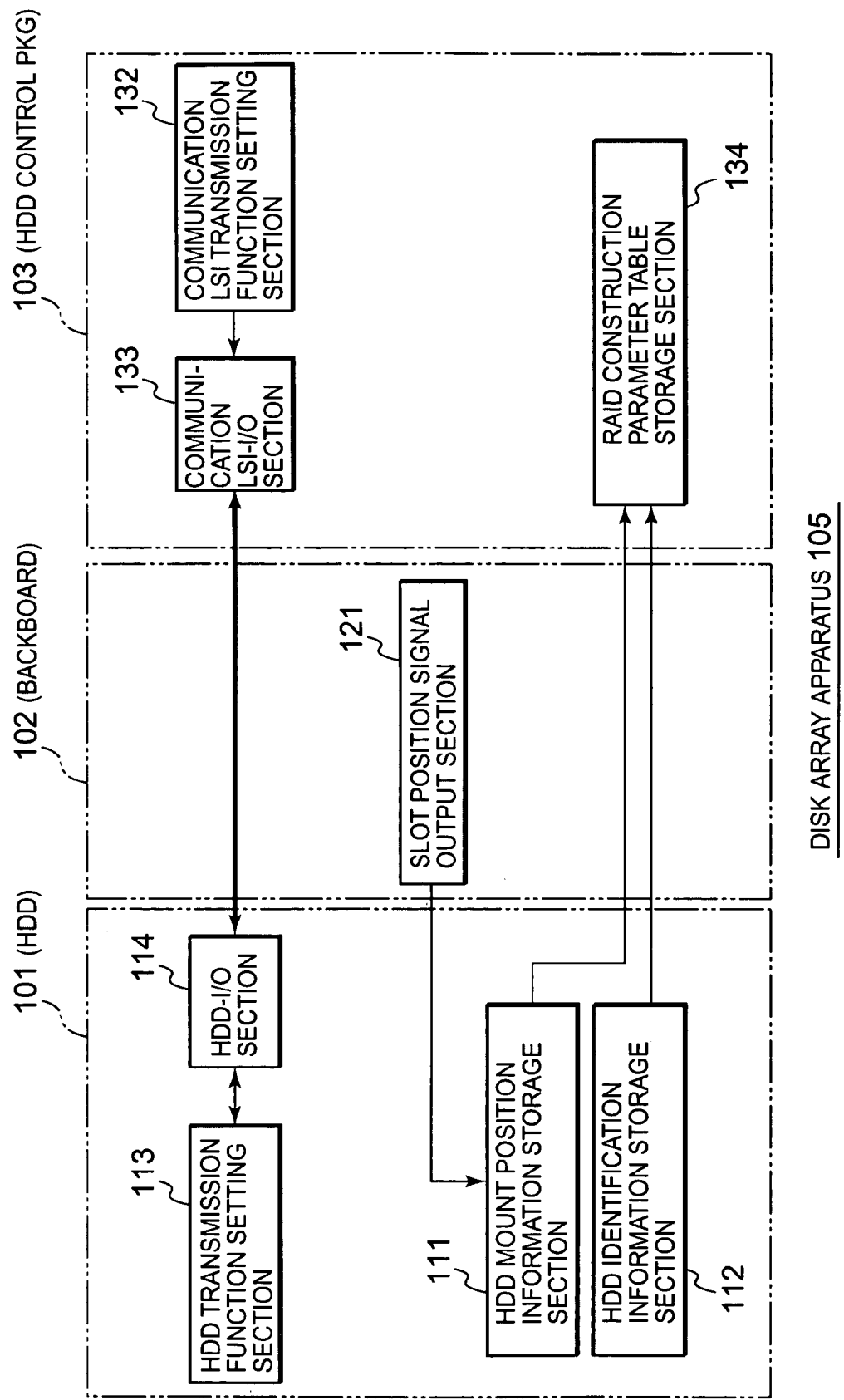
FIG. 9 shows an exemplary block diagram showing exemplary conventional disk array apparatus 105 with respect to exemplary connections among exemplary HDD 101, exemplary backboard 102 and exemplary HDD control PKG 103.
Figure 10B:
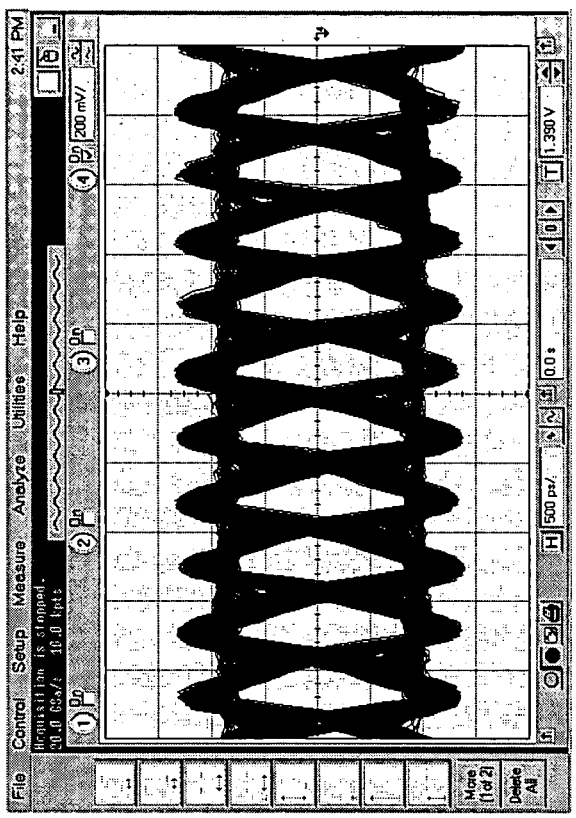
FIGS. 10A and 10B show exemplary waveform diagrams showing an exemplary difference in waveform between exemplary HDD models.
Figure 10A:
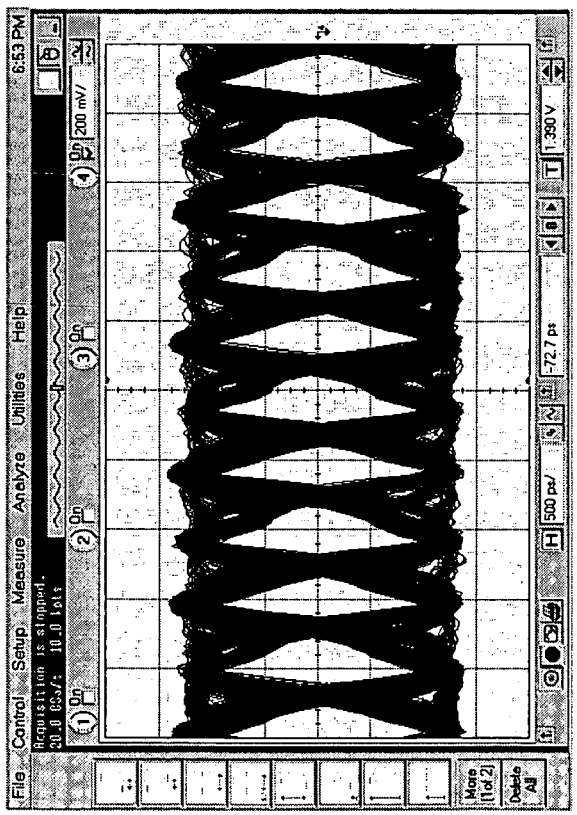
Figure 11B:
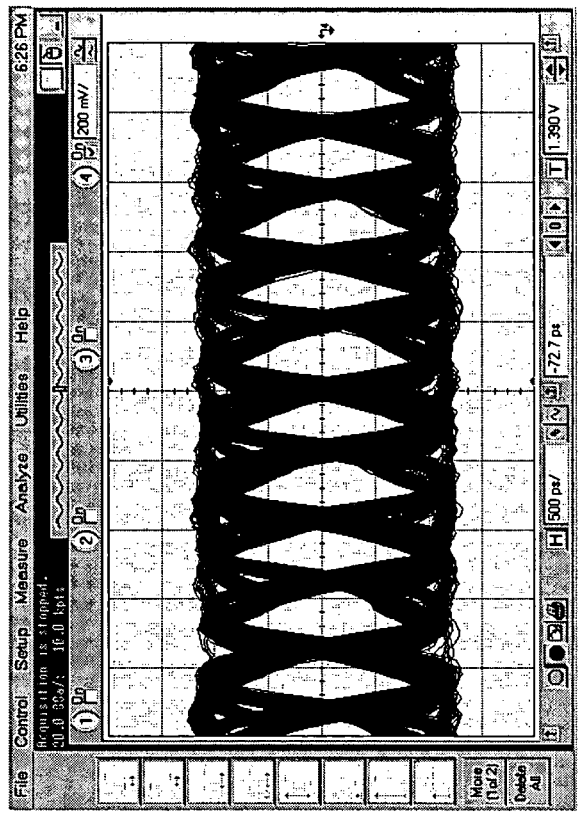
FIGS. 11A and 11B show exemplary waveform diagrams showing an exemplary difference in waveform between exemplary HDD mount positions.
Figure 11A:
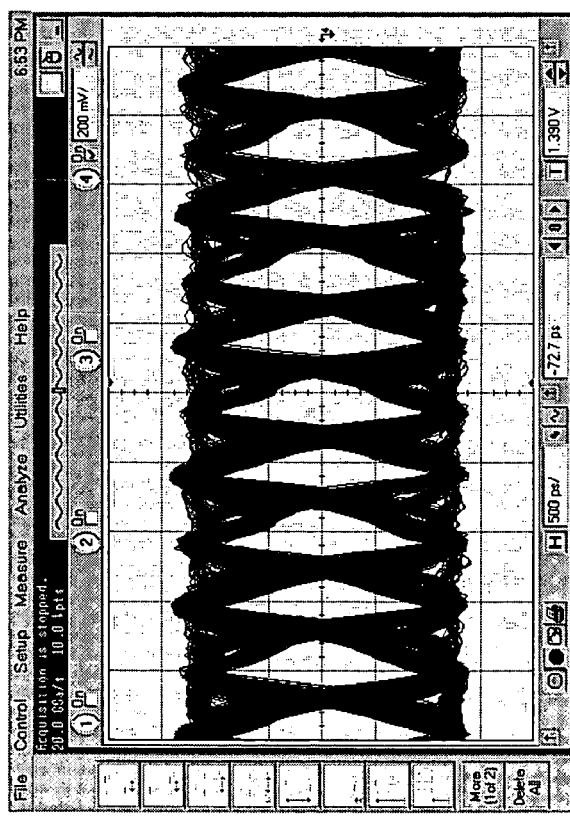
Figure 12B:
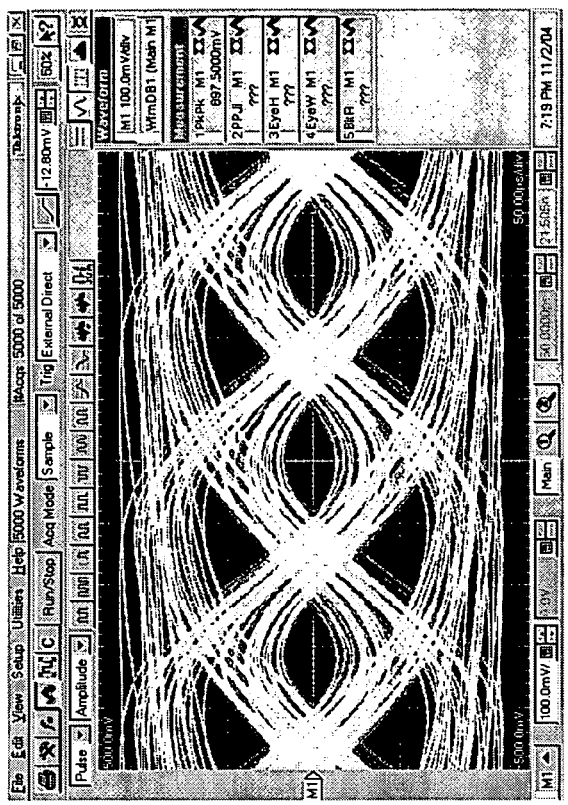
FIGS. 12A and 12B show exemplary waveform diagrams showing an exemplary difference in waveform with respect to the exemplary transmission rate.
Figure 12A:
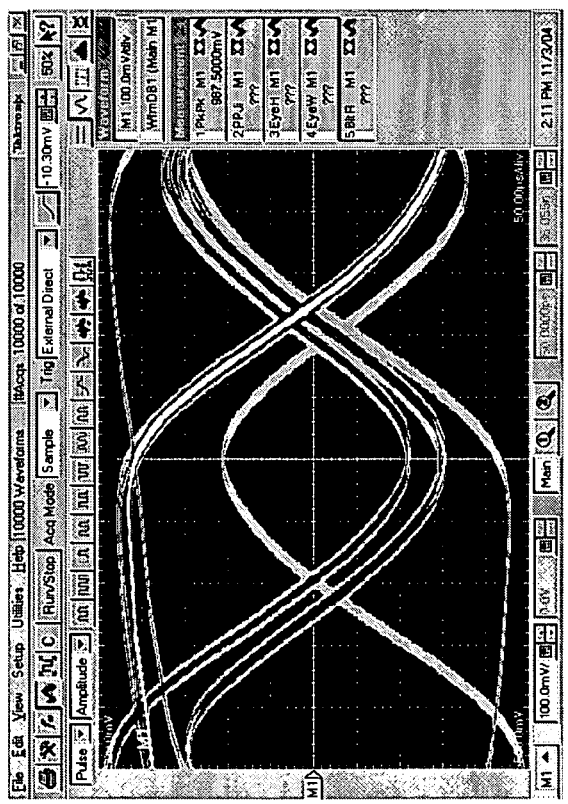
Figure 13B:
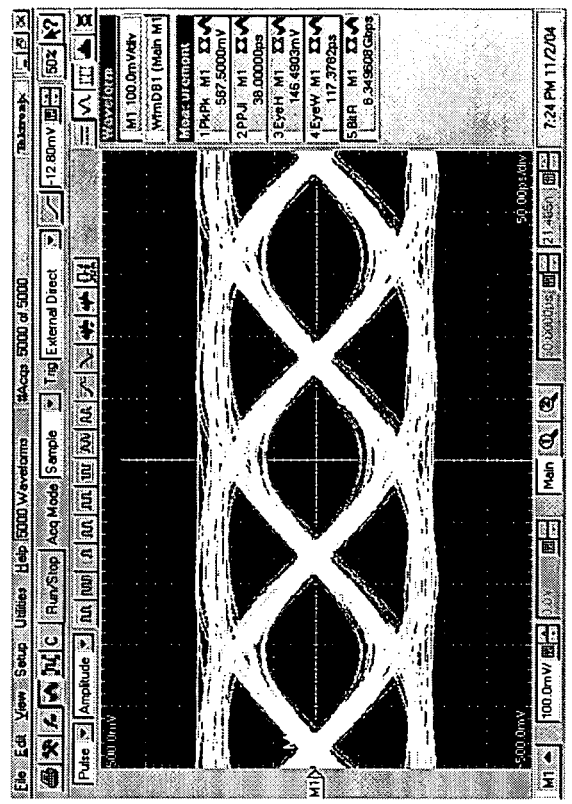
FIGS. 13A and 13B show exemplary waveform diagrams showing an exemplary difference in waveform with respect to exemplary preemphasis.
Figure 13A:
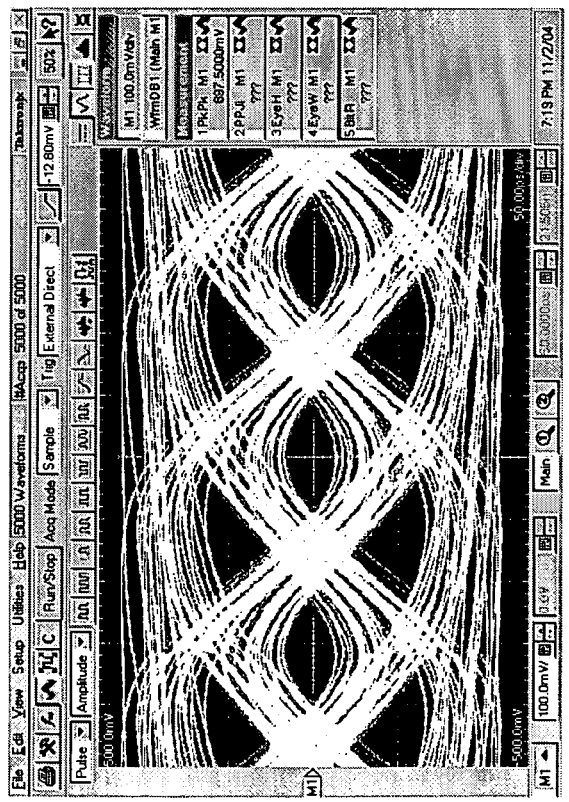

FIG. 8 shows an exemplary flowchart showing an exemplary operation in exemplary disk array apparatus 5 in the second exemplary embodiment. Description will be made below with reference to FIGS. 6 to 8. Portions identical to those shown in FIG. 5 are indicated by the same reference characters, and thus description of the identical portions will be omitted.

Determination is first made as to whether or not HDD identification information 12a is stored in transmission optimization parameter table 31a (step 110), for example. If HDD identification information 12a is not stored, then transmission optimization parameter table 31a in HDD control PKG 3 may be overwritten with transmission optimization parameter table 15a stored in HDD 1' (step 111). In other exemplary respects, the operation is the same as that in the first embodiment.

As described above, in this second exemplary embodiment, data transmission parameters 31b may be determined by using the parameter table which has not been stored in advance in transmission optimization parameter table storage section 31'.

INDUSTRIAL APPLICABILITY

The present invention may applied to disk array apparatus 5 capable of mounting, for example, by a backboard and a cable a plurality of storage media drives (e.g., HDDs, tape media, or optical disks, etc.) having a high-speed serial interface such as a Fibre Channel, an SATA (Serial Advanced Technology Attachment) or an SAS (serial Attached SCSI).

While this invention has been described with reference to exemplary embodiments, this description is not intended as limiting. Various modifications of the illustrative embodiments, as well as other embodiments of the invention, will be apparent to persons skilled in the art upon taking description as a whole. It is, therefore, contemplated that the appended claims will cover any such modifications or embodiments as fall within the true scope of the invention.

Further, the inventor's intent is to encompass all equivalents of all the elements of the claimed invention even if the claims are amended during prosecution.

This application is based on Japanese Patent Application No. 2005-032011 filed on Feb. 8, 2005 and including specification, claims, drawings and summary. The disclosure of the above Japanese Patent Application is incorporated herein by reference in its entirety.

What is claimed is:

1. A storage medium array controller, a storage medium drive being controllable by said storage medium array controller, wherein:
    said storage medium array controller receives a data storage medium drive information; and
    said storage drive medium is attached to said storage medium array controller with a wiring length corresponding to a mount position of said storage drive medium; and
    said storage medium array controller sets a data transmission parameter with respect to the storage medium drive based on said data storage medium drive information including said mount position.

2. The storage medium array controller according to claim 1, wherein:
    a plurality of said storage medium drives are controllable by said storage medium array controller;
    said storage medium array controller selectively receives data storage medium drive information with respect to each of said storage medium drives; and
    said storage medium array controller selectively sets said data transmission parameter based on each of said data storage medium drive information.

3. The storage medium array controller according to claim 1, comprising:
    an information input device that inputs said storage medium drive information from said storage medium drive.

4. The storage medium array controller according to claim 3, further comprising:
    a parameter determination device that determines said data transmission parameter based on said storage medium drive information.

5. The storage medium array controller according to claim 4,
wherein said storage medium drive includes a storage medium-side transmission function setting device that sets said data transmission parameter, and
wherein said storage medium array controller includes a parameter output device that outputs said data transmission parameter determined by said parameter determination device, to said storage medium-side transmission function setting device.

6. The storage medium array controller according to claim 4,
wherein said storage medium array controller includes a control-side transmission function setting device that sets said data transmission parameter, and
wherein said storage medium array controller includes a parameter output device that outputs said data transmission parameter determined by said parameter determination device, to said control-side transmission function setting device.

7. The storage medium array controller according to claim 4, wherein:
said parameter determination device includes a transmission parameter table indicating correspondence between said storage medium drive information and said data transmission parameter; and
said parameter determination device determines said data transmission parameter by collating said storage medium drive information input from said information input device with said transmission parameter table.

8. The storage medium array controller according to claim 2, wherein said storage medium drive information includes at least one of identification information and mount position information about said storage medium drive.

9. The storage medium array controller according to claim 1, wherein said data transmission parameter includes at least one of an output amplitude, a degree of preemphasis, an input impedance and an equalizer rate.

10. The storage medium array controller according to claim 5, wherein at the time of at least one of:
powering-up of said storage medium array controller;
replacement of said storage medium drive; and
addition of said storage medium drive,
said information input device receives said storage medium drive information;
said parameter determination device determines said data transmission parameter; and
said parameter output device outputs said data transmission parameter.

11. The storage medium array controller according to claim 1, wherein the data transmission is performed by high-speed serial communication.

12. The storage medium array controller according to claim 1, wherein said storage medium drive includes a hard disk drive.

13. A storage medium array controller, a plurality of storage medium devices being controllable by said storage medium array controller, wherein:
each of said storage drive mediums are attached to said storage medium array controller with a wiring length corresponding to a mount position of each of said storage drive medium;
said storage medium array controller sets a first data transmission parameter with respect to one of said storage medium drives based on said mount position of the storage medium;
said storage medium array controller sets a second data transmission parameter with respect to another one of said storage medium drives based on said mount position of the storage medium.

14. A storage medium array apparatus, comprising:
a storage medium drive;
a storage medium array controller which controls said storage medium drive;
wherein said storage medium array controller receives a data storage medium drive information;
wherein said storage drive medium is attached to said storage medium array controller with a wiring length corresponding to a mount position of said storage drive medium;
wherein said storage medium array controller sets a data transmission parameter with respect to the storage medium drive based on said data storage medium drive information including said mount position.

15. The storage medium array apparatus according to claim 14,
wherein said storage medium drive includes:
a storage medium-side transmission parameter table storage device in which a transmission parameter table indicating correspondence between said storage medium drive information and said data transmission parameter is storable,
wherein said storage medium array controller includes:
a parameter determination device that determines said data transmission parameter based on said storage medium drive information,
wherein said parameter determination device is selectively supplied with said transmission parameter table from said storage medium-side transmission parameter table storage device.

16. The storage medium array apparatus according to claim 15,
wherein said parameter determination device determines said data transmission parameter by collating said storage medium drive information with said transmission parameter table.

17. The storage medium array apparatus according to claim 14, comprising:
a connection device through which said storage medium drive and said storage medium array controller are connectable to each other, wherein said connection device includes:
an attachment/detachment mechanism that is attachable/detachable to said storage medium drive; and
a storage medium drive mount position information output device that outputs storage medium drive mount position information to the storage medium drive attached to said attachment/detachment mechanism,
wherein said storage medium drive includes:
a storage medium-side transmission function setting device that sets said data transmission parameter relating to data transmission;
a storage medium-side data input/output device that executes data transmission to said storage medium array controller;
a storage medium drive mount position information storage device that stores said storage medium drive mount position information output from said storage medium drive mount position information output device; and
a storage medium drive identification information storage device that includes storage medium drive identification information stored in advance, wherein said storage medium array controller further includes:
- a control-side transmission function setting device that sets said data transmission parameter relating to data transmission;
- a control-side data input/output device that executes data transmission to said storage medium drive;
- a control-side transmission parameter table storage device that includes:
  - an information input device that inputs storage medium drive information from said storage medium drive;
  - a parameter determination device that determines said data transmission parameter based on said storage medium drive information; and
  - a parameter output device that outputs said data transmission parameter determined by said parameter determination device to said storage medium-side transmission function setting device; and
- a redundant array of inexpensive disks (RAID) construction parameter table storage device that sets a RAID construction parameter by inputting said storage medium drive mount position information from said storage medium drive mount position information storage device and said storage medium drive identification information from said storage medium drive identification information storage device.

18. A storage medium drive, comprising:
a storage medium-side transmission function setting device that sets a data transmission parameter,
wherein said data transmission parameter is output from a storage medium array controller;
wherein said storage drive medium is attached to said storage medium array controller with a wiring length corresponding to a mount position of said storage drive medium; and
wherein said transmission parameter are set based on said mount position.

19. The storage medium drive according to claim 18, comprising:
a storage medium-side transmission parameter table storage device in which a transmission parameter table indicating correspondence between storage medium drive information about said storage medium drive and said data transmission parameter is storable.

20. The storage medium drive according to claim 19, wherein said transmission parameter table is written at the time of formatting of said storage medium drive.

21. A method of controlling a storage medium array, comprising:
providing a data storage medium drive information to a storage medium array controller, said storage medium array controller is attached to said storage medium array controller with a wiring length corresponding to a mount position of said storage drive medium; and
selectively setting a data transmission parameter with respect to the data storage medium drive based on said data storage medium drive information including said mount position.

22. The method of controlling a storage medium array according to claim 21, further comprising:
providing a data storage medium drive.

23. The method of controlling a storage medium array according to claim 21, further comprising:
determining said data transmission parameter based on said input storage medium drive information.

24. The method of controlling a storage medium array according to claim 22, further comprising:
powering up said storage medium array controller and said data storage medium drive.

25. The method of controlling a storage medium array according to claim 22, further comprising:
referring to at least one of storage medium drive mount position information and storage medium drive identification information, at a time of detecting a slot position signal.

26. The method of controlling a storage medium array according to claim 22, further comprising:
connecting said storage medium drive to a connection device, at a time of not detecting a slot position signal.

27. The method of controlling a storage medium array according to claim 26, further comprising:
collating at least one of said storage medium drive mount position information and said storage medium drive identification information with a transmission parameter table.

28. The method of controlling a storage medium array according to claim 27, further comprising:
overwriting said transmission parameter table in said storage medium array controller with said transmission parameter table stored in said storage medium drive, when said storage media drive identification information is not stored in said transmission parameter table.

29. The method of controlling a storage medium array according to claim 28, further comprising:
transmitting a transmission parameter to a storage medium drive transmission function setting section to set said transmission parameter.

30. The method of controlling a storage medium array according to claim 29, further comprising:
providing a transmission function setting section in said storage medium drive.

31. The method of controlling a storage medium array according to claim 29, further comprising:
providing a communication LSI transmission function setting section in said storage medium array controller.

32. The method of controlling a storage medium array according to claim 30, further comprising:
initiating data transfer between a storage medium drive and said communication LSI transmission function setting section.

33. A signal-bearing medium embodying a program of machine-readable instructions executable by a digital processing apparatus, said program causing a storage medium array controller to perform a method of claim 21.

* * * * *